United States Patent [19]

Rhodes et al.

[11] 4,234,429
[45] Nov. 18, 1980

[54] SYSTEM FOR SEPARATING PARTICULATE MATTER INTO SOLUBLE AND INSOLUBLE PORTIONS

[75] Inventors: Cecil C. Rhodes, Farmington Hills; Robert S. Kozar, Livonia, both of Mich.

[73] Assignee: Amsted Industries Incorporated, Chicago, Ill.

[21] Appl. No.: 15,455

[22] Filed: Feb. 26, 1979

[51] Int. Cl.² .......................................... B01D 37/00
[52] U.S. Cl. ............................. 423/109; 210/416 R; 210/771; 423/131; 423/471; 422/119; 422/267
[58] Field of Search ............... 210/68, 69, 73 R, 97, 210/400, 409, 416; 423/101, 109, 656.5, 131; 55/228, 229, 83, 84, 85

[56] References Cited

U.S. PATENT DOCUMENTS

| | | | |
|---|---|---|---|
| 3,199,265 | 8/1965 | Takahashi et al. | 55/22 |
| 3,249,242 | 5/1966 | Phillips et al. | 55/22 |
| 3,582,317 | 6/1971 | Gamo et al. | 423/109 |
| 3,795,486 | 3/1974 | Ekman | 55/22 |
| 3,840,365 | 10/1974 | Hammes Sr. et al. | 423/27 |
| 3,868,440 | 2/1975 | Lindblad | 423/109 |

Primary Examiner—Charles N. Hart
Assistant Examiner—E. Rollins Cross
Attorney, Agent, or Firm—John L. Schmitt; Fred P. Kostka; Edward J. Brosius

[57] ABSTRACT

Particulate matter collected by an environmental air quality control device may be in part toxic in nature and thus not readily disposable. By separating the toxic portion of the particulate matter from a nontoxic portion, disposal of nontoxic portion may be more easily accomplished. This separation may be readily effected where the toxic portion is soluble and the nontoxic portion is insoluble, thus allowing the toxic soluble portion to be formed into a solution with a dissolving liquid. The nontoxic insoluble portion then may be filtered from the toxic solution, rinsed, dried and disposed of accordingly.

4 Claims, 1 Drawing Figure

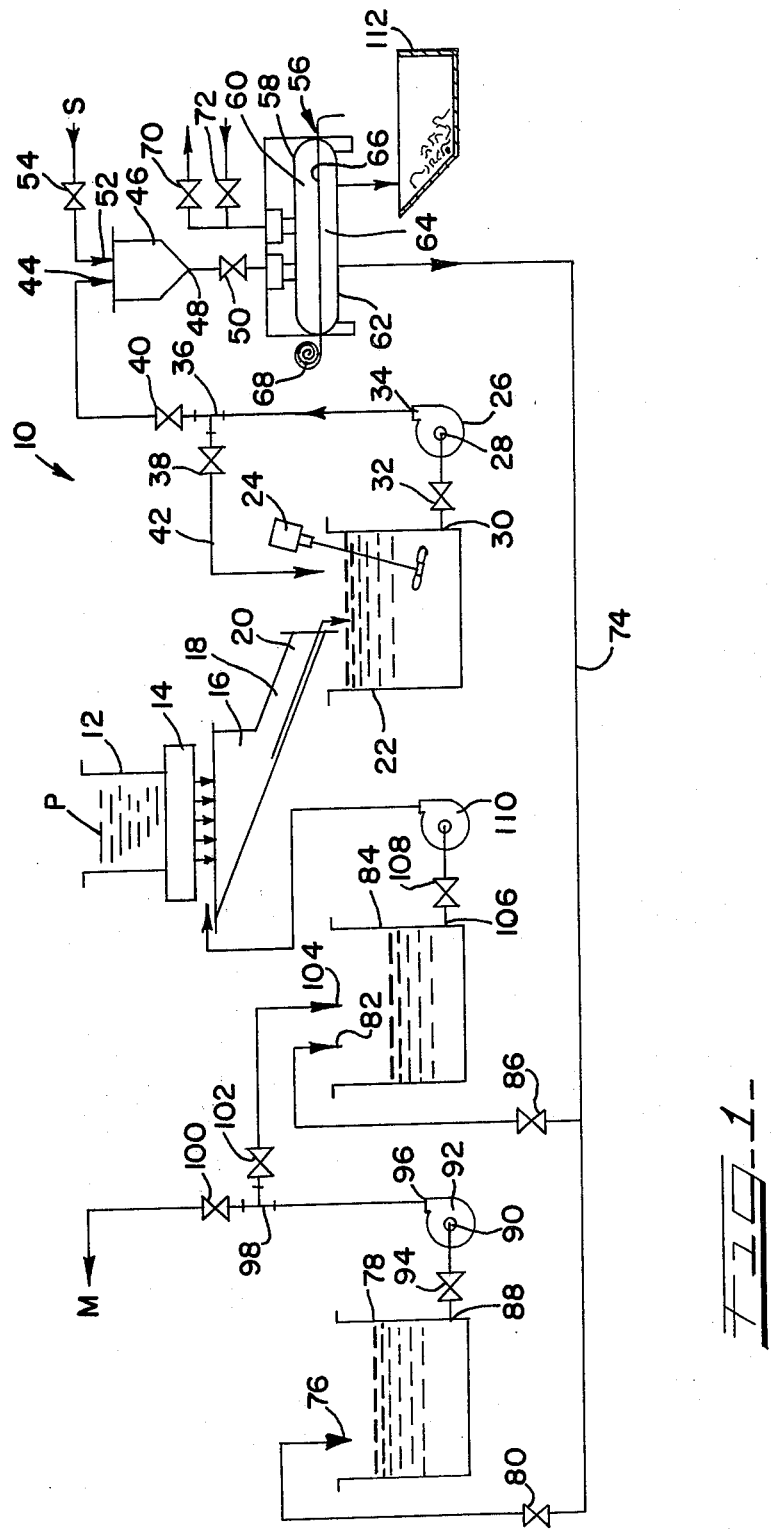

SYSTEM FOR SEPARATING PARTICULATE MATTER INTO SOLUBLE AND INSOLUBLE PORTIONS

BACKGROUND OF THE INVENTION

1. Field of the Invention

This invention relates to the treatment of particulate matter collected, for example, pursuant to an environmental air quality control requirement. Disposal of the particulate may be more readily accomplished by separating the particulate into portions having different physical and chemical characteristics.

2. Description of the Prior Art

Leaching whereby a substance is subjected to a flow of liquid to remove a soluble portion of the substance is well known. One example in years past is wood ashes being leached with water to produce lye, i.e. a strong, alkaline solution. The lye was then used to make soap.

Leaching has also proved to be valuable in processing baghouse dust collected pursuant to environmental air quality control requirements applicable to a galvanizing process. This dust or particulate contains proximately 50 percent insoluble aluminum and zinc oxides which are nontoxic. A remainder of the dust is toxic being primarily soluble aluminum, zinc and ammonia chlorides. The insoluble portion being nontoxic could be disposed of as a landfill while the soluble portion reused in the formation of galvanizing fluxes.

One method of separating the soluble and insoluble portions is the use of vacuum filtration after the dust and water are countercurrently mixed in two to five stages.

SUMMARY OF THE INVENTION

A feeder dispenses at a selective rate a quantity of dry particulate matter into a stream of dissolving liquid running down an inclined trough. The particulate matter and liquid flow into a dissolving tank where the liquid and particulate matter are formed into a slurry by an agitator and a filter charging pump which pumps the slurry in a closed loop path to and from the dissolving tank. The soluble portion of the particulate matter is completely dissolved to form a solution with the dissolving liquid while the undissolved portion is placed in suspension.

The slurry is then pumped to a filter charging tank which in turn fills an inlet chamber of a filter device separated from an outlet chamber by a section of filter media. By applying air pressure to the inlet chamber, the solution is forced through the filter media whereon the undissolved particulate portion collects to form a cake. The solution is collected in a filtrate tank.

Clean dissolving liquid is then introduced under pressure into the inlet chamber of the filtering device to rinse the cake and remove any residue of the solution remaining in the cake. The cake then may be air dried. This rinsing liquid is collected in a rinse tank.

The solution in the filtrate tank and the liquid in the rinse tank, as required, may be blended to form additional dissolving liquid for further mixing with the dry particulate matter from the dispenser.

This inventive system has several advantages.

First, this system provides superior separation of the soluble and insoluble particulate matter portion so as to provide a toxic-free substance allowing ready disposition.

Secondly, the system may be so controlled to operate continuously in that the filtering device will produce successive batches of the insoluble particulate matter portion.

Thirdly, the solution produced is reusable if concentrated, for example by heating. Thus, the amount of solution which must be disposed of and the amount of new make-up chemicals which must be added may be minimized if desired.

DESCRIPTION OF THE DRAWINGS

FIG. 1 is a schematic diagram of this system for separating particulate matter into soluble and insoluble portions.

DESCRIPTION OF THE PREFERRED EMBODIMENT

A system for separating a soluble and a nonsoluble portion of a dry particulate matter is shown generally in FIG. 1 and designated 10. The system 10 includes a bin 12 in which a particulate matter P may be conveniently stored. To a bottom of the bin 12 is attached a dispenser 14 which is located over an upper end 16 of a downwardly inclined sluice trough 18. A lower end 20 of the trough 18 is positioned over an open top end of a dissolving tank 22.

The dissolving tank 22 includes an agitator 24 to improve mixing therein. A filter charging pump 26 having an intake 28 connects to a bottom outlet 30 in the tank 22 through a first valve 32. A discharge 34 of the charging pump 26 in turn connects with a T-fitting 36 which in turn is joined to a second and a third valve 38, 40.

The second valve 38 is further connected to a dissolving tank return pipe 42 while the third valve 40 is joined to a first top inlet 44 of a charge tank 46. A bottom outlet 48 of the charge tank 46 connects with a fourth valve 50. Additionally, the charging tank 46 has a second top inlet 52 which connects with a source S of clean dissolving liquid through a fifth valve 54.

A filtering device 56 is divided horizontally into a movable upper shell portion 58 forming a top inlet chamber 60 and a fixed lower shell portion 62 forming an outlet chamber 64 by a section of filter media 66. The inlet chamber 60 is connected to the fourth valve 50. The section of filter media 66 may be of a disposable nature and supplied from a roll 68 located external to the filter device 56.

The inlet chamber 60 of the filter device 56 is further connected to a vent valve 70 and an air supply valve 72. The outlet chamber 64 of the filtering device 56 is joined to a discharge line 74 which in turn connects with an inlet 76 of a filtrate tank 78 through a sixth valve 80. This discharge line 74 also connects with a rinse inlet 82 of a rinse tank 84 through a seventh valve 86.

The filtrate tank 78 has a bottom outlet 88 which is linked to an intake 90 of a transfer pump 92 through an eighth valve 94. A discharge 96 of the transfer pump 92 in turn connects with a T-fitting 98 which further joins with a ninth valve 100 and a tenth valve 102. The ninth valve 100 connects the transfer pump 92 to an external using means M (not shown) while the tenth valve 102 joins the transfer pump 92 to a filtrate inlet 104 of the rinse tank 84. A bottom outlet 106 of the rinse tank 84 connects with the upper end 16 of the sluice trough 18 through an eleventh valve 108 and a dissolver charge pump 110.

During the initial operating cycle of the system 10, the rinse tank 84 initially will contain a dissolving liquid, in this case water. With the eleventh valve 108 open and the dissolver charge pump 110 energized, water is pumped at a controlled rate to the upper end 16 of trough 18. The dispenser 14 is activated to meter out at a controlled rate the dry particulate P from the bin 12 into the water flow in the trough 18.

In this embodiment, the dry particulate is a dust collected by an air pollution control system connected to a galvanizing line located external to the system 10. A portion of the dust is water soluble and comprises aluminum, zinc and ammonium chlorides which are toxic in nature. These chlorides, being soluble in water, would contaminate a surrounding area if disposed of as a landfill. The insoluble portion of the dust comprises nontoxic aluminum and zinc oxides. The optimum ratio of water to dust has been found to proximate 9 to 1 so as to produce 10 percent dust concentration.

It should be understood that the system 10 of this invention is not limited to this particular application but could be applied to a number of waste products which may not be readily disposed of without further processing.

When the desired amount of dust and water are present in the dissolving tank 22, the eleventh valve 108 is closed and the dissolver charge pump 110 and the dispenser 14 deenergized.

During the flow of dust and water into the dissolving tank 22 from the lower end 20 of the trough 18, the agitator 24 is activated so as to form a slurry of the dust and water. When the dissolving tank 22 has been so charged, the first valve 32 and second valve 38 are opened, the third valve 40 closed, and the filter charge pump 26 energized. By pumping the water and dust in a closed loop path from the bottom outlet 30 of the dissolving tank 22, through the filter charge pump 26 and back into the dissolving tank 22 by means of the return pipe 42, the dust and water are thoroughly mixed. After 10 minutes of such circulation, the soluble portion of the dust has dissolved in the water to form a solution while the remaining insoluble portion is placed in suspension.

Upon completion of this mixing, the second valve 38 is closed and the third valve 40 opened allowing the slurry to be pumped into the filter charge tank 46 to a precise level as controlled by a level control switch operatively connected to the second and third valves 38, 40. With the filter charge tank 46 filled as noted above, the third valve 40 is again closed and the second valve 38 again opened allowing the slurry in the dissolving tank 22 to continue to circulate.

When the filter charge tank 46 is full, the fourth valve 50 and the vent valve 70 are opened for a sufficient time duration to allow the slurry in the filter charge tank 46 to drain into the inlet chamber 60 of the filter device 56. The fourth valve 50 and the vent valve 70 are then closed while the air supply valve 72 and the sixth valve 80 are opened. A controlled flow of compressed air enters the inlet chamber 60 of the filter device 56 so as to increase the pressure level within the inlet chamber 60 to proximately 25 psi. Under this pressure, the solution of water and dissolved portion of the dust in the slurry is forced through the section of filter media 66 in the filtering device 56. As this solution passes through the filter media 66, the undissolved portion of the dust is separated therefrom to form a gradually increasingly thick cake on the section of filter media 66.

Once substantially all the solution in the filter device 54 has been forced into the filtrate tank 78 through the discharge line 74, the pressure in the inlet chamber 60 drops because there is less resistance to the flow of air. Upon this drop in pressure within the inlet chamber being sensed, the air supply valve 72 is immediately closed to prevent the cake from becoming overly dry and cracking. Concurrent with the closing of valve 72, the sixth valve 80 is also closed.

At the same time that the vent valve 70 and the fourth valve 50 where closed after the slurry filled the filter device inlet chamber 60, the fifth valve 54 was opened so as to fill the filter charge tank 46 with clean rinse water to a level such that the amount of rinse water is proximately equal to one-half the amount of the slurry. The fifth valve 54 is then closed. As noted above, when the air supply valve 72 and sixth valve 80 were closed, the fourth valve 50 and the vent valve 70 are then opened allowing the clean water in the filter charge tank 46 to drain to the inlet chamber 60 and cover the cake of the undissolved portion of the dust.

The fourth valve 50 and the vent valve 70 are again closed while the air supply valve 72 and the seventh valve 86 are opened to selectively force the clean water in the inlet chamber 60 through the cake and rinse from the cake any residue of the solution. This rinse water flows into the rinse tank 84.

When substantially all of the clean water has been forced through the cake, a drop in air pressure in the filter device inlet chamber 60 activates the timer allowing air to flow for a selective time period into the inlet chamber 60 through the cake to dry such. At the end of this drying period, the seventh valve 86 and the air supply valve 72 are closed and the vent valve 70 opened. The inlet chamber 60 of the filter device 56 is thus returned to atmospheric pressure.

To remove the cake of undissolved portion of the dust, the upper shell portion 58 of the filter device 56 is raised from the lower shell portion 62. The section of filter media 66 may be supported on a filter media conveyor (not shown) allowing that section to be indexed forward. The media and the cake may be conveniently deposited in a receptacle 112. The cake as so deposited will contain less than 1 percent soluble chlorides. As the section of filter media 66 is being indexed forward, a new clean section of filter media is drawn from the roll 68 and positioned between the upper and lower filter device shell portions 58, 62. The upper shell portion 58 then may be lowered to again form a seal with the lower shell portion 62.

As can be seen from FIG. 1, the capacity of the filtrate tank 78, the rinse tank 84 and the dissolving tank 22 are each substantially greater than the filter charge tank 46. This allows the filter device portion of the system 10 to continue to operate even if another portion of the system is down.

Since the rinse tank 84 may contain one-half of the amount of liquid required to form the slurry needed to fill the filter charge tank 46, additional liquid must be added to the rinse tank 84. This liquid may be obtained from the filtrate tank 78 which contains the solution of water and dissolved chlorides from previous cycles. By opening the eighth valve 94 and the tenth valve 102, closing the ninth valve 100 and energizing the transfer pump 92, the rinse tank 84 may be filled to a selective level as controlled by a level switch operatively connected to the heretofore mentioned valves 94, 100, 102 and the pump 92.

If the filtrate tank 78 is not sufficiently emptied by this transfer of the solution to the rinse tank 84, the ninth valve 100 may be opened and the tenth valve 102 closed allowing the solution in the filtrate tank 78 to be pumped to the external combustion means M. Pumping the solution from the filtrate tank 78 to the means M may also be effected independent of the rinse tank filling procedure if such is required.

With a sufficient amount of liquid in the rinse tank 84, the dissolving tank 22 may be filled as required to supply the filter charge tank 46. This filling is accomplished as noted earilier by opening the eleventh valve 108 and activating the dissolving charge pump 110 and the dispenser 14.

Note that the concentration of dissolved chlorides in the liquid pumped from the rinse tank 84 is sufficiently below the saturation point so as to insure that the chlorides in the dust mixed with that liquid are effectively dissolved.

Note further that the procedure of emptying the filtrate tank 78, filling the rinse tank 84 from the filtrate tank 78 and filling the dissolving tank 22 may be substantially independent of the cycling of the filter device 56 because of the larger capacity of these three tanks 22, 78 and 84.

While various modifications may be suggested by those versed in the art, it should be understood that we wish to embody within the scope of the patent warranted hereon, all such modifications as reasonably and properly come within the scope of our contribution to the art.

What is claimed is:

1. A method of separating portions of particulate matter collected pursuant to environmental air quality control requirements so that said particulate matter may be more readily disposed of, said particulate matter comprising a soluble chloride portion and an insoluble metallic oxide portion, said method comprising the steps of:

(1) dispensing a controlled amount of said particulate matter over a substantial area forming an upper end of an inclined trough receiving a controlled volume of a flow of a dissolving liquid comprising substantially water wherein said particulate may be wetted by said liquid, (2) agitating said particulate and said liquid in a dissolving tank connected to a lower end of said trough, (3) forming a slurry of said particulate and said liquid by pumping for proximately 10 minutes said particulate and said liquid in a closed loop path connecting with said dissolving tank, said pumping and said agitation causing said soluble portion of said particulate to dissolve in said liquid and form a solution and suspending said insoluble portion in said slurry, (4) pumping a portion of said slurry into a charge tank to fill said charge tank with a selective volume of said slurry, (5) flowing said slurry in said charge tank into an inlet chamber formed by an upper shell portion of a filtering device further defined by an outlet chamber separated from said inlet chamber by a horizontally disposed section of filter media, (6) applying sufficient air pressure to said inlet chamber of said filter device to cause said solution to flow through said filter media and said insoluble portion to collect on said media to form a continuous passage-free cake thereon without said air flowing through said cake, (7) sensing a drop in said air pressure upon a substantial amount of said solution having flowed to said outlet chamber, (8) activating venting means to decrease said air pressure in said inlet chamber to an ambient value upon sensing said pressure drop, (9) filling said charge tank with a selective volume of a rinsing liquid, said rinsing liquid volume being proximately one-half of said slurry volume,

(10) flowing said rinsing liquid in said charge tank into said inlet chamber of said filter device,

(11) applying sufficient air pressure to said inlet chamber to cause said rinsing liquid to flow through said cake and said filter media to rinse said continuous passage-free cake and remove any further residue of said solution entrapped in said cake,

(12) sensing a drop in said air pressure upon a substantial amount of said rinse liquid having flowed to said outlet chamber, and activating a timing device thereupon, (13) flowing air through said cake to dry said cake for a selective time period as regulated by said timing device, and

(14) lifting said upper shell portion of said filter device from said section of filter media to allow said section of filter media and said cake carried thereon to be indexed from said filter device and be disposed of accordingly.

2. A method as defined by claim 1 and further including the steps of:

(15) collecting said solution in a filtrate tank connected to said outlet chamber of said filter device,

(16) collecting said rinse liquid in a rinse tank connected to said outlet chamber of said filter device, and

(17) adding a volume of said solution in said filtrate tank to said rinse liquid in said rinse tank to form additional dissolving liquid, said solution from said filtrate tank and said rinse liquid in said rinse tank being mixed at a ratio proximating 1 to 1.

3. Apparatus particularly adapted for separating in a batch operation a particulate dust into a soluble portion and an insoluble remainder portion, said apparatus comprising, a dust receiving means to hold a supply of said dust, dispensing means carried beneath said dust receiving means to selectively dispense said dust at a controlled rate over a substantial area, inclined trough means positioned below said dispensing means to receive said disposed dust, said trough means having an upper end prepared to receive a flow of a dissolving liquid, dissolving tank means positioned to receive said flow of a dissolving liquid and said dust from a lower end of said trough means, said dissolving tank carrying an agitating device to mix said dust and said liquid received therein, slurry forming means including a filter charge pump forming part of a closed loop flow path with said dissolving tank wherein said liquid and dust may be formed into a slurry comprising a solution of said liquid and said soluble portion of said dust and said insoluble remainder portion of said dust in suspension, a charge tank means connected to said slurry forming means to receive a selective volume of said slurry during a first portion of said batch operation and connected to a supply of a rinsing liquid to receive a selective volume of said rinsing liquid during a further portion of said batch operation, a filter device including a liftable upper shell forming an inlet chamber connected to said charge tank to selectively receive said slurry or said rinsing liquid, and an outlet chamber separated from said inlet chamber by a section of a filter media, and air supply means connected to said filter device upper chamber to selectively apply a force to said slurry in said inlet chamber to cause said solution to pass through said section of filter media and said insoluble remainder portion of said slurry to form into a cake on said section of filter media, and to selectively apply a force to said rinse liquid in said inlet chamber to cause said rinse liquid to pass through said cake and wash said cake, said air supply means including control means to sense a drop in a pressure of said air after a substantial amount of said solution has passed to said filter outlet chamber to close said air supply and open an atmosphere vent connected to said inlet chamber and maintain said cake in a continuous passage-free condition and to sense a further drop in said pressure of said air after a substantial portion of said rinse liquid has passed to said filter outlet chamber to activate a timing device to allow a flow of air through said cake to dry such, wherein said dust and said liquid may be effectively mixed in said slurry to dissolve said soluble portion of said dust in said liquid and form said solution, and insoluble remainder portion in said slurry being separated from said solution in said filter device and said insoluble remainder portion being readily disposable as a rinsed and dried cake.

4. An apparatus as defined by claim 3 and further characterized by including, filtrate tank means connected to said outlet chamber of said filter device to selectively receive said solution, rinse tank means connected to said outlet chamber of said filter device to selectively receive said rinsing liquid, transfer pumping means connected between said filtrate tank means and said rinse tank means to selectively move said solution in said filtrate tank to said rinse tank to mix said solution with said liquid in said rinse tank and form additional dissolving liquid, and dissolver pumping means connected to said rinse tank and said upper end of said including trough means to supply said dissolving liquid in said rinse tank to said upper end of said trough means.

* * * * *